(12) United States Patent
Lipp

(10) Patent No.: US 6,772,100 B2
(45) Date of Patent: Aug. 3, 2004

(54) MULTIPATH MITIGATION FILTER

(75) Inventor: John I. Lipp, Lewisville, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 316 days.

(21) Appl. No.: 10/022,497

(22) Filed: Dec. 17, 2001

(65) Prior Publication Data

US 2003/0115007 A1 Jun. 19, 2003

(51) Int. Cl.$^7$ .............................................. G06F 15/00
(52) U.S. Cl. ...................... 702/193; 702/189; 702/190; 702/194; 702/195; 342/148
(58) Field of Search ................................ 702/189, 190, 702/193, 194, 195; 342/148, 159, 195

(56) References Cited

U.S. PATENT DOCUMENTS

2003/0081659 A1 * 5/2003 Yousef et al. ................ 375/148

\* cited by examiner

*Primary Examiner*—John Barlow
*Assistant Examiner*—Stephen J. Cherry

(74) *Attorney, Agent, or Firm*—Williams, Morgan & Amerson, P.C.

(57) ABSTRACT

A technique for estimating the position of an object from sensor measurements in the presence of multipath conditions is disclosed. In one aspect, the technique includes a position estimator comprising a signal filter, a multipath detector, and a multipath bias estimator. The signal filter is capable of receiving a sensor measurement and generating a measurement noise variance estimate and a position estimate therefrom. The multipath detector is capable of applying a dynamic threshold against the measurement noise variance estimate to determine whether a multipath condition exists. And, the multipath bias estimator is capable of generating a correction for multipath induced measurement bias error from a measurement noise variance estimate for application upon determining that a multipath condition exists. In another aspect, the technique includes a method comprising filtering the sensor measurement with a measurement noise variance estimator to yield a measurement noise variance estimate; comparing the estimate against a dynamic threshold to detect whether a multipath condition exists; determining a correction for a multipath induced measurement bias error from the estimate if the multipath condition is detected; and applying the correction to the estimation of the object's position.

38 Claims, 9 Drawing Sheets

MULTIPATH MITIGATION FILTER

This application is related to my commonly assigned, co-pending application Ser. No. 10/023,346, filed on even date herewith, entitled "Kalman Filter With Adaptive Measurement Noise Variance Estimator", which is hereby incorporated by reference for all purposes as if expressly set forth verbatim herein.

BACKGROUND OF THE INVENTION

1. Field of the Invention

The present invention pertains to remote sensing, and, more particularly, to the employment of a multipath mitigation filter in such applications.

2. Description of the Related Art

Figure 1:
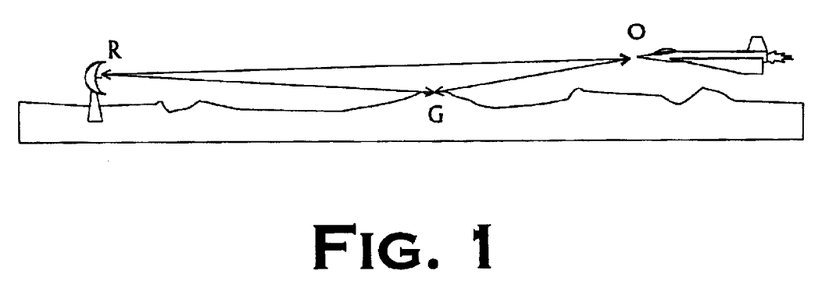
FIG. 1 depicts a multipath condition giving rise to the multipath error.

FIG. 1 depicts a classic example what is known as a "multipath" condition giving rise to a "multipath" error such as is addressed by the present invention. "Multipath" describes the condition where more than one path exists for the propagation of signals, such as electromagnetic or acoustic signals. Consider the generic radar scenario illustrated in FIG. 1. A radar illuminates an object and measures the signal energy, which returns by four different paths. A portion of the energy is:

- directly transmitted to the object and returns from the object along the path R→O→R;
- directly transmitted to the object and returns indirectly by bouncing off the ground along the path R→O→R;
- indirectly transmitted to the object by bouncing of the ground and returns directly to the object along the path R→G→O→R; and
- indirectly transmitted to the object by bouncing off the ground and returns indirectly by bouncing off the ground along the path R→G→O→G→R.

Each path has a different time-delay and different signal attenuation. Under the proper conditions, the direct signal and the indirect signal(s) interact. Exemplary factors defining "proper conditions" include primarily object altitude, radar height, object-to-radar range, radar wavelength, radar beam width, and terrain type, although there are others. This phenomenon is also encountered in applications employing other kinds of energy, e.g., remote sensing applications employing sonar, synthetic aperture radar, sonograms, CAT scans, PET scans, etc.

The interaction can result in reinforcement or cancellation of the returned signals. In either case, the multipath conditions introduce error. This is sometimes referred to as "interference" since the reflected signals interfere with one another, but is also sometimes referred to as "distortion." If the returned signals are in phase, the interference is constructive. If out of phase, the interference is destructive and degrades the quality of the radar's measurements significantly. In particular, monopulse tracking radars suffer severe multipath induced elevation measurement errors. And, when the conditions are just right, the received radar signals can completely cancel each other.

For a ground-based radar, multipath is encountered tracking low-altitude objects. The primary manifestations are low signal-to-noise ratio at the radar's receiver, very noisy measurements, and large elevation errors. More particularly, a track from a radar experiencing multipath distortion may be biased up or down and be noisy. The multipath problem is worse for a sea-based radar because salt water, being electrically conductive, reflects radar signals like a mirror. The direct and indirect returns can destructively interfere such that a very low power signal is received by the radar during an extended period of time. Consequently, the measurement noises increase during the presence of multipath and in some cases, the radar may even lose track because the object "fades away." In other words, the returned signal level drops below the receivers' detection level.

Multipath detection can be accomplished in monopulse radars by processing the monopulse elevation quadrature signal. However, in many applications, monopulse quadrature signals are not available, and an alternate multipath detection scheme is needed.

The present invention is directed to resolving, or at least reducing, one or all of the problems mentioned above.

SUMMARY OF THE INVENTION

The invention is a technique for estimating the position of an object from return signals in the presence of multipath conditions. In its various aspects, the invention is manifested as a position estimator; a method for estimating the position of a object from returned signals; a program storage medium encoded with instructions that, when executed, perform such a method; and a computing device programmed to perform such a method. The position estimator, in one embodiment, comprises a signal filter, a multipath detector, and a multipath bias estimator. The signal filter is capable of receiving a sensor measurement and generating a measurement noise variance estimate and a position estimate therefrom. The multipath detector is capable of applying a dynamic threshold against the measurement noise variance estimate to determine whether a multipath condition exists. And, the multipath bias estimator is capable of generating a correction for multipath induced measurement bias error from a measurement noise variance estimate for application upon determining that a multipath condition exists. The method includes filtering the sensor measurement with a measurement noise variance estimator to yield a measurement noise variance estimate; comparing the estimate against a dynamic threshold to detect whether a multipath condition exists; determining a correction for a multipath induced measurement bias error from the estimate if the multipath condition is detected; and applying the correction to the estimation of the object's position.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 2A:
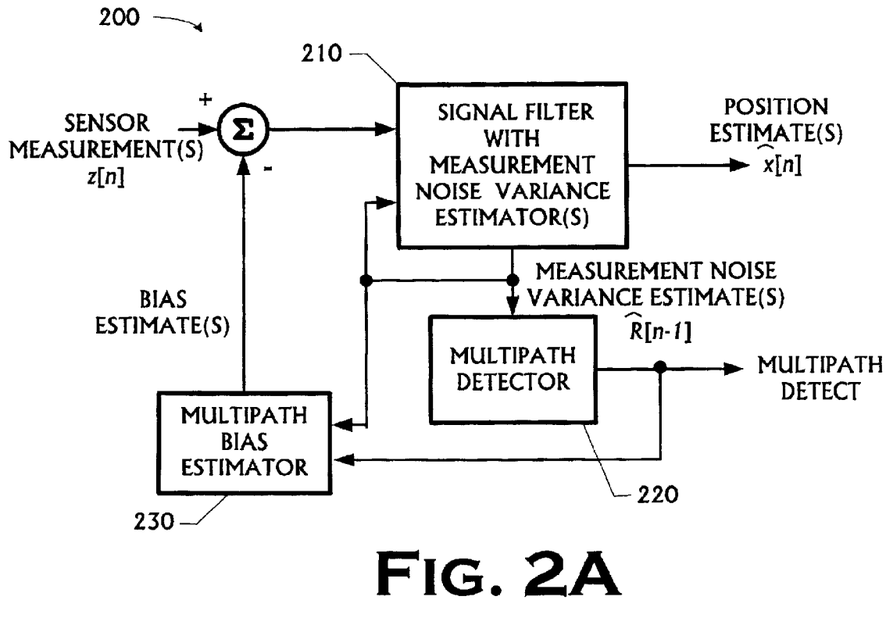
FIG. 2A and FIG. 2B conceptually illustrate alternative multipath mitigation filters in accordance with the present invention in a feedback and a feedforward mode, respectively.

Turning now to the drawings, FIG. 2A conceptually illustrates a multipath mitigation filter 200 in accordance with the present invention. The filter 200 comprises, in this particular embodiment, three processes. First, a signal filter 210 with a measurement noise estimator is applied to the sensor measurement z[n]. The sensor measurement z[n] typically includes azimuth, elevation, and range data extracted from, for instance, returned radar signals. Second, a multipath detector 220 compares the elevation and/or azimuth measurement noise variance estimates against dynamic thresholds. Third, in the event multipath has been detected, a multipath bias estimator 230 computes a correction for a multipath induced bias error and applies it.

Figure 2B:
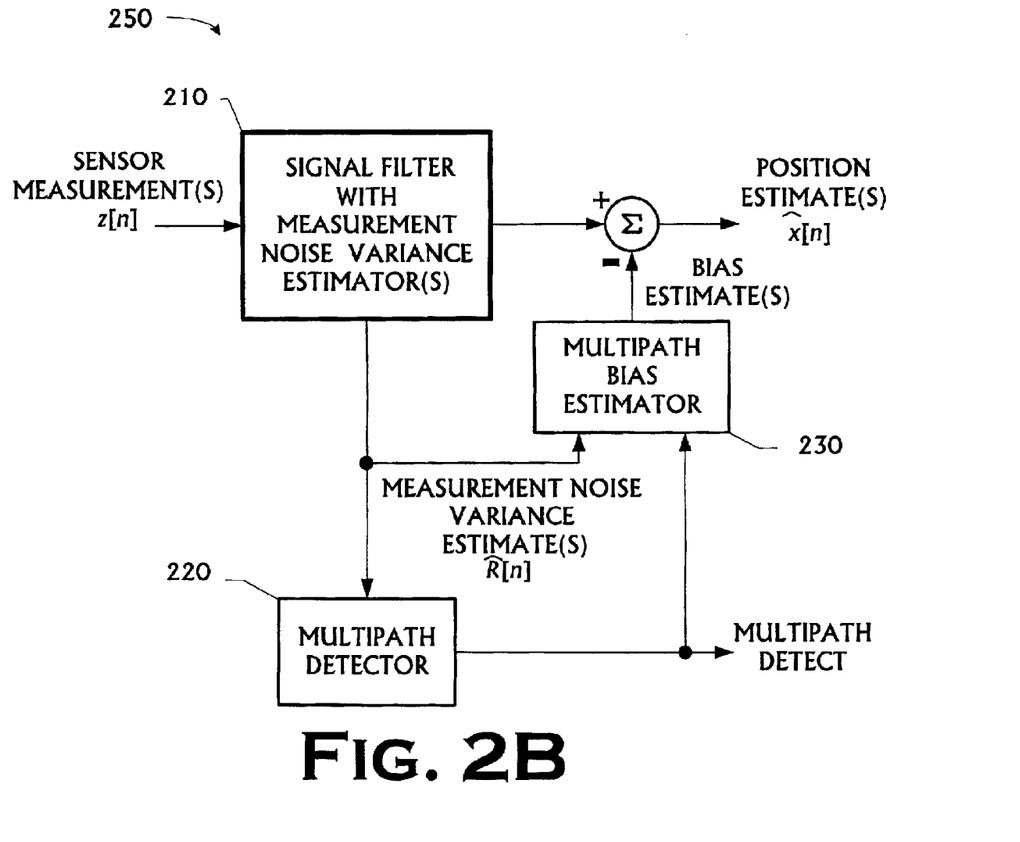

FIG. 2B conceptually illustrates an alternative multipath mitigation filter 250 in accordance with the present invention. The filter 250 also comprises, in this particular embodiment, three processes. First, a signal filter 210 with a measurement noise estimator is applied to the sensor measurement z[n]. The sensor measurement z[n] typically includes azimuth, elevation, and range data extracted from, for instance, returned radar signals. Second, a multipath detector 220 compares the elevation and/or azimuth measurement noise variance estimates against dynamic thresholds. Third, in the event multipath has been detected, a multipath bias estimator 230 computes a correction for a multipath induced bias error and applies it. Note, however, that the filter 250 in FIG. 2B applies the correction in a feedforward mode, i.e., to the filtered measurements x[n], whereas the filter 200 in FIG. 2A applies the correction in a feedback mode, i.e., directly to the signal measurements z[n].

Figure 3:
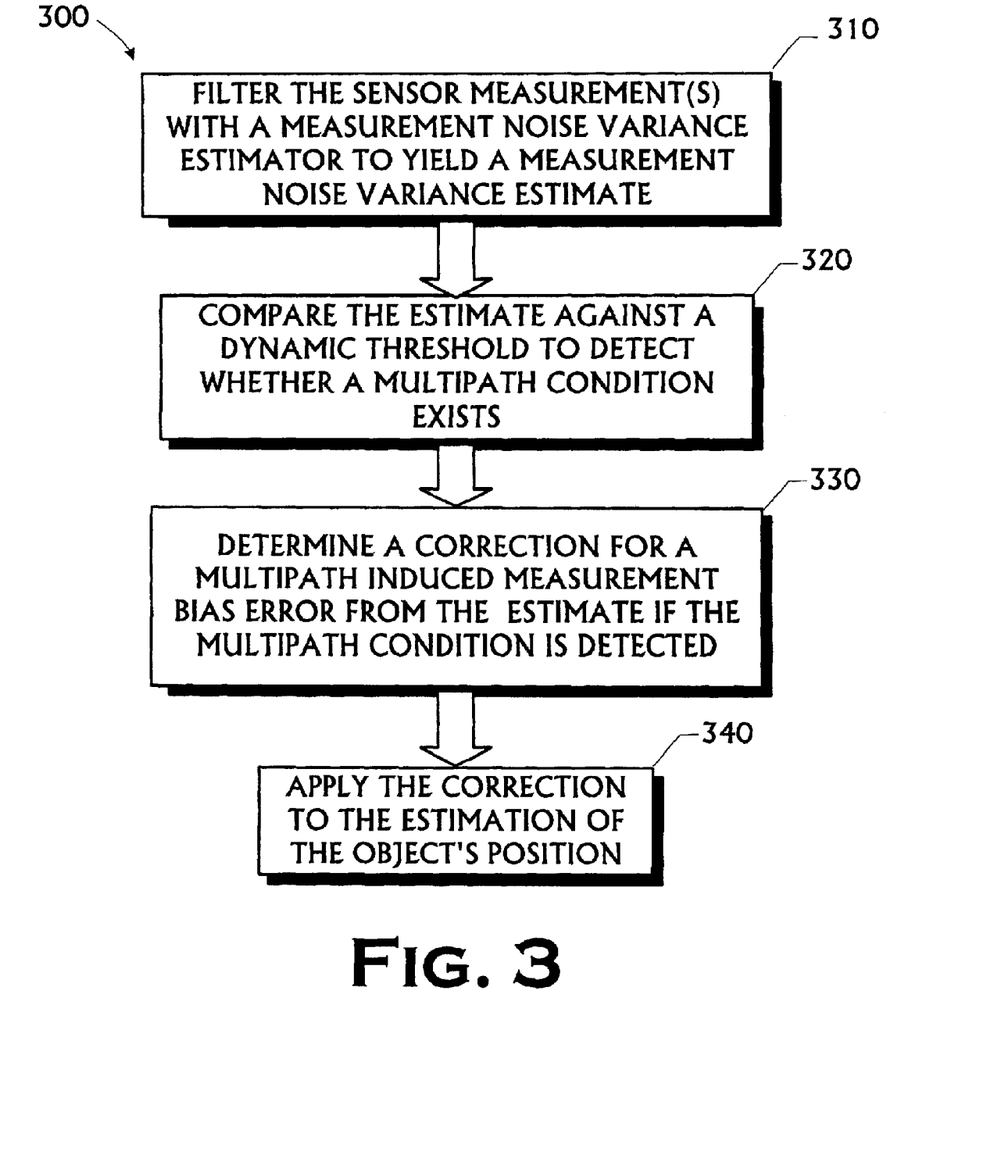
FIG. 3 illustrates one particular method for filtering a sensor measurement in accordance with the present invention.

FIG. 3 illustrates one particular method 300 for estimating the position of an object from returned signals. The method 300 begins by first filtering one or more sensor measurement (s) with a measurement noise variance estimator to yield one or more corresponding measurement noise variance estimate (s), as set forth in the box 310. The method 300 then compares the estimate(s) against a dynamic threshold to detect whether a multipath condition exists, as set forth in the box 320. The method 300 then determines a correction for a multipath induced measurement bias error from the estimate if the multipath condition is detected, as set forth in the box 330. Next, the method 300 applies the correction to the estimation of the object's position, as set forth in the box 340. In a feedback implementation, the correction is applied to the sensor measurement(s) and, in a feedforward implementation, to the position estimate(s).

The present invention is typically implemented in software. Thus, the elements of the multipath mitigation filter 200 in FIG. 2A are implemented in code that, when executed by a computing device of some kind, perform a method such as the method 300 in FIG. 3. Note, however, that the filter 200 may be implemented in hardware, or in some combination of hardware and software, to perform a method such as the method 300.

Figure 4:
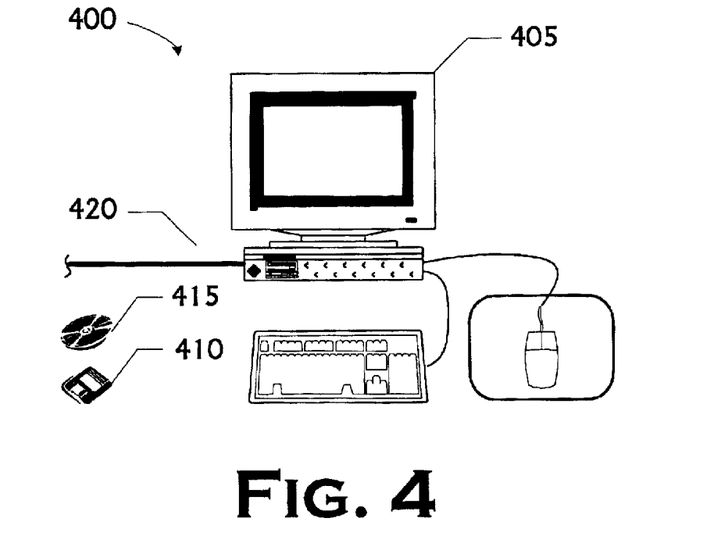
FIG. 4 depicts one particular computing device with which the signal filter may be implemented.

FIG. 4 illustrates one particular embodiment of a computing system 400 with which the invention may be implemented in this particular aspect of the invention. The computing system 400 is used in a radar implementation, although the invention is not so limited. A measured radar signal is converted to a digital representation, and then filtered by processing the digital representation using software implementing the method described in relation to FIG. 3, or one of the variations thereon previously discussed. In various manifestations, the invention may also be:

- a computing device (e.g., the computer 405) programmed to perform the method of FIG. 3;
- a program storage medium (e.g., the floppy disk 410 or the optical disk 415) encoded with instructions that, when executed by a computer (e.g., the computer 405), perform the method of FIG. 3; or
- a transmission medium (e.g., the cable 420) over which the method of FIG. 3 may be performed on data stored on a remote computer (e.g., the computer 405).

The invention admits wide variation in this aspect. For instance:

- the illustrated computer 405, for instance, is a workstation, but may be a desktop, laptop, mini-, a mainframe computer, or a processor (e.g., a digital signal processor, or "DSP", or a microprocessor) embedded in a piece of equipment (e.g., a receiver) in various implementations;
- the computing system 400 might comprise many computing devices such as the computer 405, configured in a local area network ("LAN"), a wide area network ("WAN"), a system area network ("SAN"), an "intranet," or even a portion of the Internet;
- the program storage medium may be magnetic (e.g., the floppy disk 410) or optical (e.g., the optical disk 415);
- the program storage medium may be random access (e.g., the floppy disk 410) or read only (e.g., the optical disk 415); and
- the illustrated transmission medium 420 is a co-axial cable, but may also be a twisted wire pair, an optical fiber, or even a wireless communications link.

The invention is not limited to implementation specific details such as these.

Thus, some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Figure 10A:
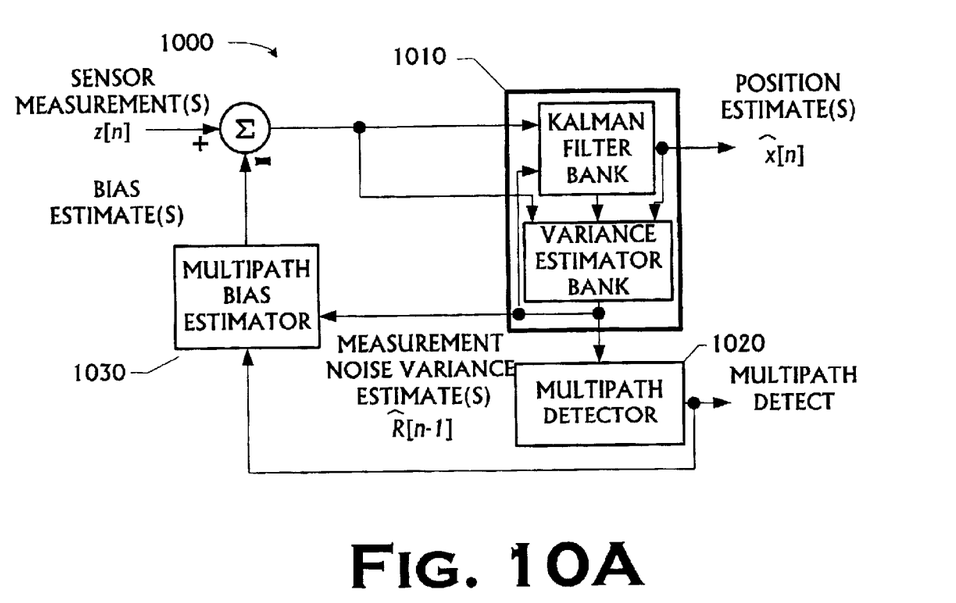
FIG. 10A and FIG. 10B depict particular implementations of the feedback and feedforward embodiments of FIG. 2A and FIG. 2B, respectively.
Figure 10B:
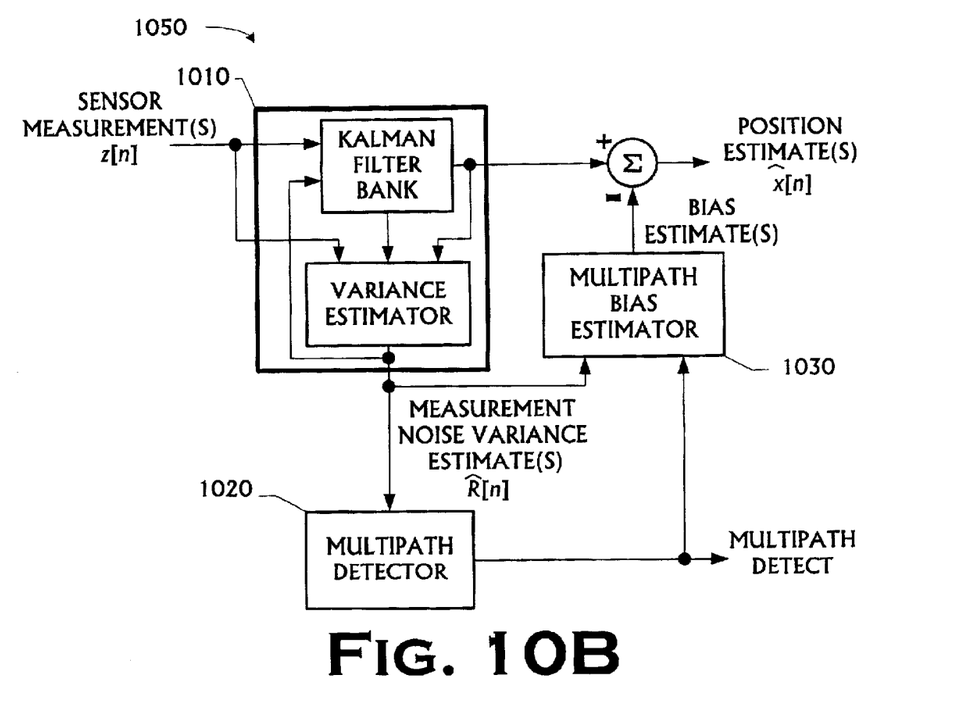

In one particular implementation, the embodiment 200 includes:

- a Kalman filter bank for processing the sensor measurements. Typical measurements are the 3-dimensional position of the object, but may also include Doppler velocity information in some embodiments. The processing consists of smoothing the noisy measurements and estimation of unmeasured object information such as velocity and acceleration. The co-ordinate system is usually spherical (range, azimuth angle, elevation angle), but it may be Cartesian, cylindrical, or other 1-to-1 transformation of the 3-dimensional object position. The filter bank may be composed of separate Kalman filter channels for processing each measurement or dimension, a single Kalman filter that processes all the measurements simultaneously, or a composite of those two schemes.
- an adaptive, measurement noise variance estimator applied to a radar's object measurements and Kalman filter output. The noise estimator generates a noise variance estimate at least for the measurement(s)/dimension(s) that contain elevation information. The remaining dimensions are optional. For example, in a spherical coordinate system, noise variance estimation must be accommodated on the elevation angle channel, but may also be applied to the azimuth angle and range channels if it is otherwise beneficial to the system.
- a radar multipath indicator is implemented by testing the measurement noise variance estimates for multipath induced abnormalities. Testing is typically via comparison of one or more of the noise variance estimates against dynamically computed thresholds. The thresholds are set based on the normal, non-multipath values that should occur.
- a multipath bias estimator that computes and applies a correction for a multipath induced measurement bias error. The bias estimate can be subtracted from the measurements (i.e., a feedback mode as illustrated in FIG. 10A) or subtracted from the Kalman filter state estimate (i.e., a feedforward mode as illustrated in FIG. 10B). The bias value is determined from the noise variance estimate when multipath has been indicated during radar operation in a low-elevation processing mode. (Low-elevation processing is entered when the radar transmission beam is operating near the earth's horizon.)

Each of these aspects of the illustrated embodiment will now be discussed.

Returning to FIG. 2A, the signal filter 210 may be implemented using various Kalman filtering techniques. To this end, in the illustrated embodiment 200, the signal filter 210 includes a Kalman filter bank 510 and a noise estimator 520, shown in FIG. 5. Some of the following discussion will involve the discussion and application of mathematical formulae. Definitions for the various notations used therein are set forth in Table 1 below. The formulae are the means by which those in the art communicate the involved concepts to one another. However, as noted above, this discussion necessarily implicates that hardware components in a computing system, such as the computing system 400, are transforming various signals conveying information represented in the equations.

TABLE 1

Definitions of Notation in Mathematical Formulae

| Symbol | Dimensions | Description |
|---|---|---|
| x[n] | N × 1 | System state vector (scalar in the case N = 1), i.e., the true position of the object |
| $\hat{x}$[n] | N × 1 | Current state vector estimate, i.e., current estimate of the object's true position |
| $\hat{x}$[n\|n − 1] | N × 1 | Predicted state vector (estimate of state vector from previously estimated state vector), i.e., prediction of the object's true position |
| P[n] | N × N | State vector estimate covariance matrix |
| P[n\|n − 1] | N × N | State vector prediction covariance matrix |
| w[n] | L × 1 | System driving noise (vector) |
| Q[n] | L × L | System driving noise covariance matrix |
| u[n] | J × 1 | System input vector |
| z[n] | 1 × 1 | Sensor measurement |
| K[n] | N × 1 | Kalman filter gain vector |
| v[n] | 1 × 1 | Measurement noise |
| R[n] | 1 × 1 | Measurement noise variance |
| $\hat{R}$[n] | 1 × 1 | Estimated measurement noise variance |
| A[n] | N × N | State transition matrix |
| B[n] | N × L | System driving noise gain matrix |
| C[n] | N × J | System input gain matrix |
| H[n] | 1 × N | Input state gain vector |
| G[n] | 1 × 1 | Error filter gain |
| S[n] | 1 × 1 | bias-to-δ ratio |
| δ[n] | 1 × 1 | Discrete kronecker delta function |

In particular, consider a discrete, vector-state, scalar measurement, system model defined as:

$$x[n]=A[n]x[n-1]+B[n]w[n] \tag{1}$$

$$z[n]=H[n]x[n]+v[n] \tag{2}$$

wherein x[n] is the true state of the system, z[n] is a sensor measurement from which the true state x[n] can be estimated, and w[n] and v[n] are independent white Gaussian noise processes with variance functions Qδ[n] and Rδ[n], respectively. In some embodiments, the signal filter 210 may be implemented using standard Kalman filtering techniques. In those cases, the pertinent quantities can be calculated as follows:

$$\hat{x}[n|n-1]=A[n]\hat{x}[n-1] \quad (3)$$

$$P[n|n-1]=A[n]P[n-1]A^T[n]+B[n]Q[n]B^T[n] \quad (4)$$

$$e[n]=z[n]-H[n]\hat{x}[n|n-1] \quad (5)$$

$$\hat{\sigma}_e^2[n]=\hat{\sigma}_e^2[n-1]+H[n]K[n-1](e^2[n]-\hat{\sigma}_e^2[n-1]) \quad (6)$$

$$\hat{R}[n]=\max(0,\hat{\sigma}_e^2[n]-H[n]P[n|n-1]H[n]^T) \quad (7)$$

$$K[n] = \frac{P[n|n-1]H^T[n]}{H[n]P[n|n-1]H^T[n]+\hat{R}[n]} \quad (8)$$

$$\hat{x}[n]=\hat{x}[n|n-1]+K[n](z[n]-H[n]\hat{x}[n|n-1]) \quad (9)$$

$$P[n]=(I-K[n]H[n])P[n|n-1] \quad (10)$$

Equation (3) is the prediction estimate of the true state x[n] and equation (4) is the associated prediction covariance matrix. Equations (5)–(8) are the prediction error, estimation of the variance of the prediction error, estimation of the measurement noise variance from the prediction error variance estimate, and the Kalman filter gain for Equations (9)–(10). Equations (9)–(10) compose the update of the prediction estimate and prediction covariance matrix with the sensor measurement z[n]. The quantity $\hat{R}[n]$ is determined as set forth below.

However, one implementation uses a specific Kalman filtering technique disclosed and claimed more fully in my commonly assigned, co-pending application Ser. No. 10/023,346, filed on even date herewith, entitled "Kalman Filter With Adaptive Measurement Noise Variance Estimator", incorporated by reference above.

Figure 5:
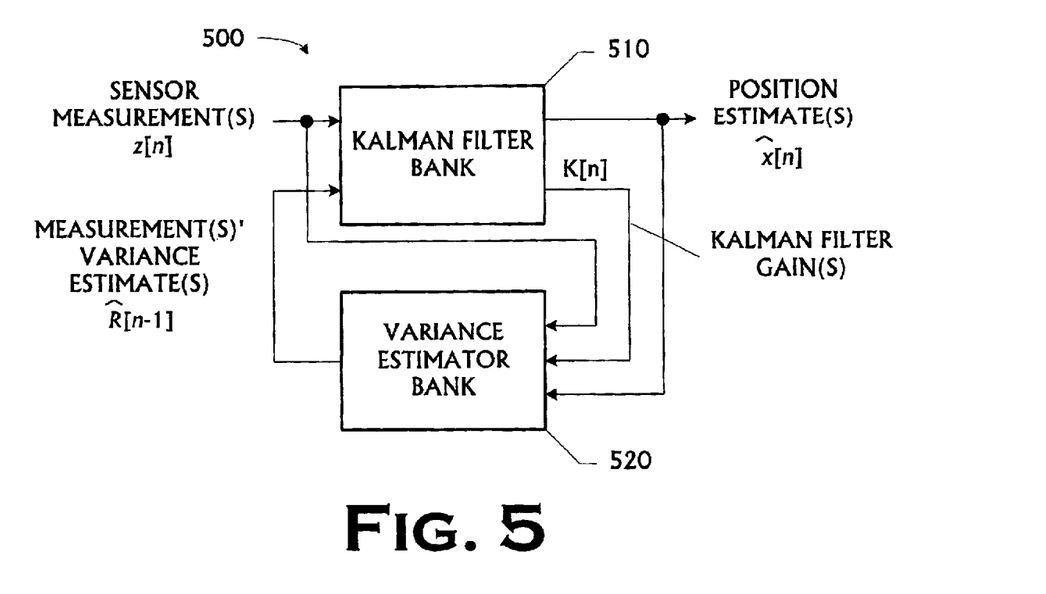
FIG. 5 conceptually illustrates one particular embodiment of the signal filtering mechanism first shown in FIG. 2A.
Figure 6:
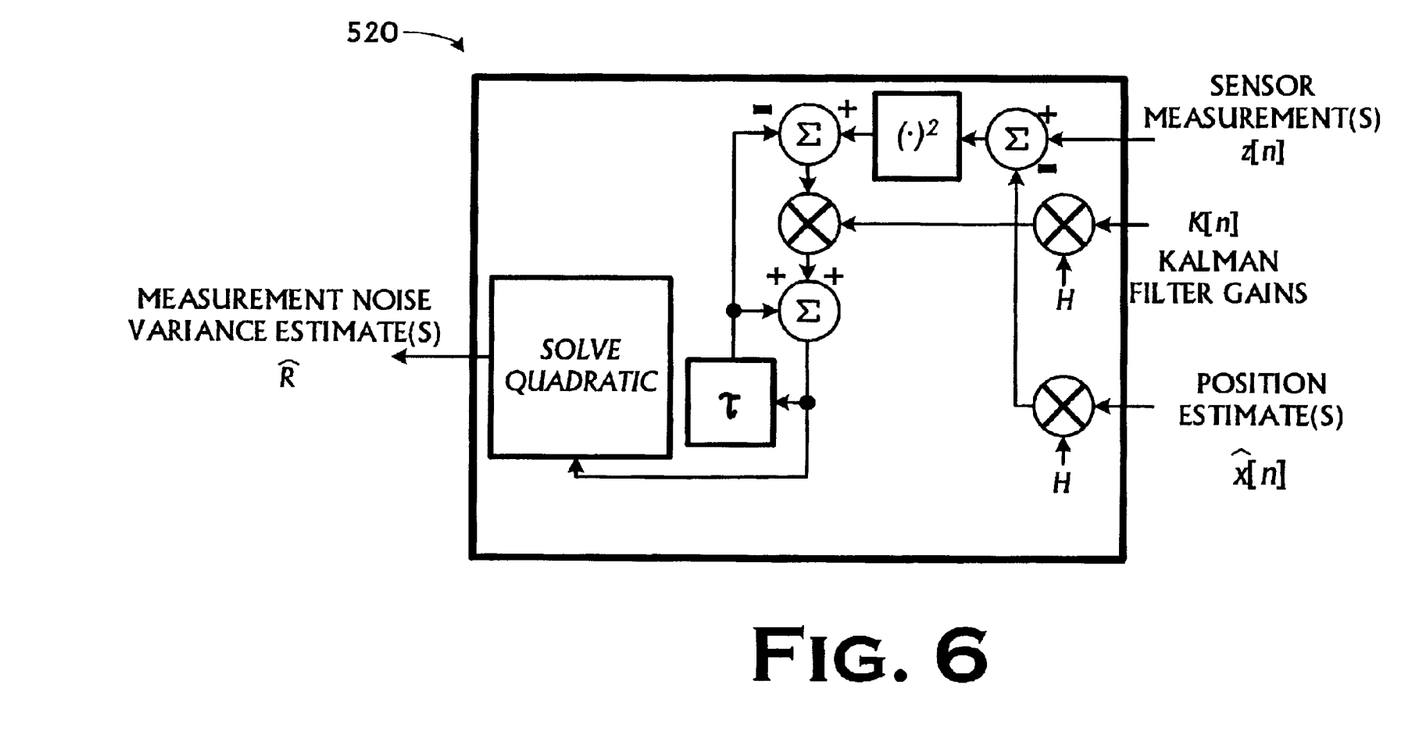
FIG. 6 conceptually illustrates one particular implementation of the variance estimator bank employed in the embodiment of the filtering mechanism shown in FIG. 5.

This particular implementation is illustrated by the filter 500 in FIG. 5. The Kalman filter 510 receives the sensor measurement z[n] and the estimated noise variance for the previous state, $\hat{R}[n-1]$, to obtain a prediction $\hat{x}[n]$ of a true state and yields a Kalman filter gain K[n]. The variance estimator 520, one implementation of which is shown in FIG. 6, receives the Kalman filter gain K[n], the sensor measurement z[n], and the current state prediction $\hat{x}[n]$ to yield the estimated noise variance for the previous state, $\hat{R}[n-1]$, for use in the Kalman filter 510.

More particularly, the sensor measurement z[n] can be Kalman filtered via the sequence of equations set forth below. First, a prediction for the current state $\hat{x}[n|n-1]$ is determined from the previous state estimate $\hat{x}[n-1]$ and the state transition matrix A[n]:

$$\hat{x}[n|n-1]=A[n]\hat{x}[n-1] \quad (11)$$

Next, the covariance matrix P[n|n−1] of the predicted current state $\hat{x}[n|n-1]$ is determined:

$$P[n|n-1]=A[n]P[n-1]A^T[n]+B[n]Q[n]B^T[n] \quad (12)$$

The gain K[n] for the Kalman filter is then determined:

$$K[n] = \frac{P[n|n-1]H^T[n]}{H[n]P[n|n-1]H^T[n]+\hat{R}[n-1]} \quad (13)$$

This gain K[n] is then used to refine, or update, the earlier computed state prediction $\hat{x}[n|n-1]$:

$$\hat{x}[n]=\hat{x}[n|n-1]+K[n](z[n]-H[n]\hat{x}[n|n-1]) \quad (14)$$

In this particular embodiment, the covariance matrix of the updated state estimate $\hat{x}[n]$ is also determined:

$$P[n]=(I-K[n]H[n])P[n|n-1] \quad (15)$$

In addition to Kalman filtering the sensor measurement z[n], this technique also filters the squared instantaneous prediction error, $e^2[n]=(z[n]-h[n]\hat{x}[n])^2$:

$$\hat{\sigma}_e^2[n]=\hat{\sigma}_e^2[n-1]+H[n]K[n](e^2[n]-\hat{\sigma}_e^2[n-1]) \quad (16)$$

which gives a smoothed estimate of the prediction error variance, $\hat{\sigma}_e^2[n]$. Solve $$\hat{R}[n]^2(2a^2[n]-1)+\hat{R}[n][\hat{\sigma}_e^2[n](1-3a^2[n])-2q[n]]+\hat{\sigma}_e^2[n](q[n]+\sigma_e^2[n]a^2[n])=0 \quad (17)$$

with the quadratic equation where:

$$a[n] = \frac{H[n]A[n]H^T[n]}{H[n]H^T[n]} \quad (18)$$

for the measurement noise variance estimate of $\hat{R}[n]$ used in the next Kalman filter cycle.

The proof of principle will now be disclosed. Again, in determining $\hat{R}[n]$ for the next Kalman filter cycle in the implementation of FIG. 5, it is H[n]x[n] that is interesting and its variance $H[n]P[n]H^T[n]$. As a Kalman filter converges, $P[n] \approx P[n-1]$. Letting n→∞, equality holds, that is, $P[\infty]=P[n]=P[n-1]$. $P[\infty]$ can be found by solving the Ricatti equation. Although the Ricatti equation is well known, its use in this manner is unknown to the art. Likewise, as n→∞, $\sigma_e^2[\infty] \equiv \text{var}(e[\infty])=H[n]P[\infty]H^T[n]+R[n]$. Assume that $\hat{R}[\infty]=R[n]$, that is, the estimator converges to the true value. From the Ricatti equation, $$\frac{1}{H[n]P[\infty]H^T[n]} = \frac{1}{(H[n]A[n])P[\infty](H[n]A[n])^T + (H[n]B[n])Q[n](H[n]B[n])^T} + \frac{1}{R[n]} \quad (20)$$

For convenience, make the approximation $$(H[n]A[n])P[\infty](H[n]A[n])^T \cong (H[n]A[n]H^{-1}[n])H[n]P[\infty]H^T[n](H[n]A[n]H^{-1}[n])^T \quad (21)$$

$$= \left(\frac{H[n]A[n]H^T[n]}{H[n]H^T[n]}\right)^2 H[n]P[\infty]H^T[n]$$

where $H^{-1}[n]=(H[n]H^T[n])^{-1}H^T[n]$ is the Moores-Penrose inverse of $H[n]$. The reason for performing this approximation is so that the substitution:

$$H[n]P[\infty]H^T[n]=\sigma_e^2[\infty]-R[n] \quad (22)$$

can be made to eliminate $P[\infty]$. Combining the values of q and a set forth above and the preceding three equations, and performing some algebra yields:

$$R^2[n](2a^2[n]-1)+R[n][\sigma_e^2[\infty](1-3a^2[n])-2q[n]]+\sigma_e^2[\infty](q[n]+\sigma_e^2[\infty]a^2[n])=0 \quad (23)$$

Typically, a Kalman filter converges after a dozen or so measurements. At this point, it is also expected that $\hat{\sigma}_e^2[n]$ has converged and may be used as an approximation for $\hat{\sigma}_e^2[\infty]$. Doing so and solving the quadratic for R generates the estimate of $R[n]$ at sample time n. The approximation changes the left term of the right-hand side of the equation set forth immediately before. Consequently, adjustment of $q[n]$, generally upward, may be desirable to improve performance.

For a more concrete example of this "observer" implementation of the first embodiment, consider a simple state system where $x_1[n]$ is position, $x_2[n]$ is velocity, and $w[n]$ is acceleration. The position state is measured. The matrices of interest are then:

$$A[n]=\begin{bmatrix} 1 & \Delta t \\ 0 & 1 \end{bmatrix} \quad (24)$$

$$B[n]Q[n]B^T[n]=\sigma_w^2\begin{bmatrix} \Delta t^3/3 & \Delta t^2/2 \\ \Delta t^2/2 & \Delta t \end{bmatrix} \quad (25)$$

$$H[n]=[1\ 0] \quad (26)$$

where $\Delta t$ is the time step and $\sigma_w^2$ is the acceleration variance. Consequently a $[n]=1$ and $q[n]=\sigma_w^2\Delta t^3/3$. Again, though, it has been experimentally found that $q[n]=\sigma_w^2\Delta t$ provides better results. Then:

$$\hat{R}[n]^2-2\hat{R}[n][\hat{\sigma}_e^2[n]+q[n]]+\hat{\sigma}_e^2[n](q[n]+\hat{\sigma}_e^2[n])=0 \quad (27)$$

which is then solved with the quadratic equation for the positive root:

$$\hat{R}[n]=(q[n]+\hat{\sigma}_e^2[n])+\sqrt{q[n](q[n]+\hat{\sigma}_e^2[n])} \quad (28)$$

Figure 7:
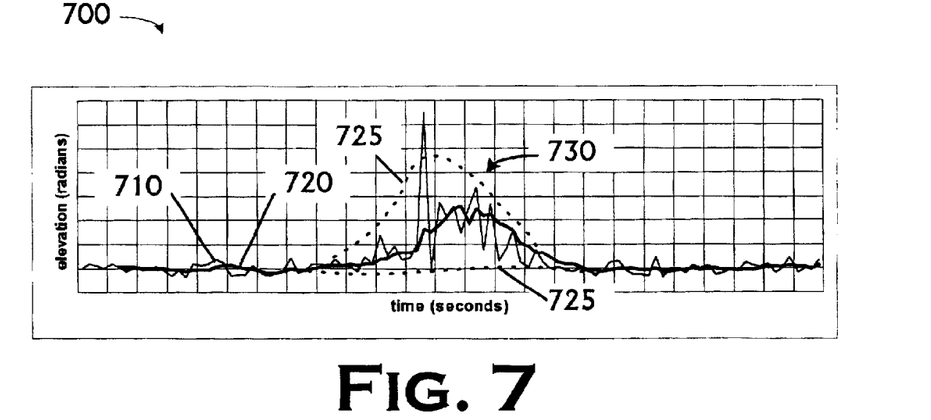
FIG. 7 illustrates an elevation measurement with multipath induced bias errors and its filtered value.
Figure 8:
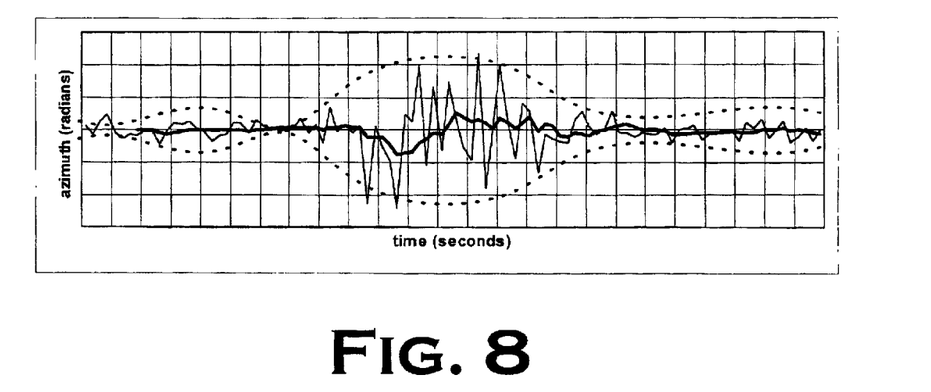
FIG. 8 illustrates an azimuth measurement taken over the same time as the elevation measurement of FIG. 7.

In normal operation, the azimuth, elevation, and range measurements are noisy, so smoothing by track filtering algorithms is employed to reduce tracking errors. The measurement noises' magnitudes are larger during multipath conditions, and the elevation measurement is biased upward for very low object elevations. FIG. 7 illustrates a track 700 of an elevation measurement 710, its filtered value 720, and its noise variance envelope 725. A region 730 of low object elevation multipath occurs in the middle of the track. As shown in FIG. 8, during multipath, the azimuth measurement may experience accentuated noise levels in similar proportion to the elevation measurement's. Unlike the elevation measurement, no measurement bias is experienced during low-elevation conditions. The range measurement can also experience increased noise during multipath, but this is not illustrated.

To facilitate Kalman filtering, the measurement noise variances are computed. These computations are nominally functions of object position (range and angle), object cross-section (assumed value, or estimated by the radar), and the electronics' thermal noise. Under multipath conditions, however, the true noise variance(s) can increase dramatically over the nominal computations. Adding a measurement noise variance estimator bank to the usual measurement filter bank (e.g., the variance estimator bank 520 in FIG. 5) solves this problem. Moreover, the measurement noise variance estimate(s) can be compared to the computed noise variance value(s). If the current variance estimate(s) are larger than the current variance computation(s), a multipath detection indication is appropriate. Such a test is known as a threshold test and has a binary output of 0 or 1.

Figure 9A:
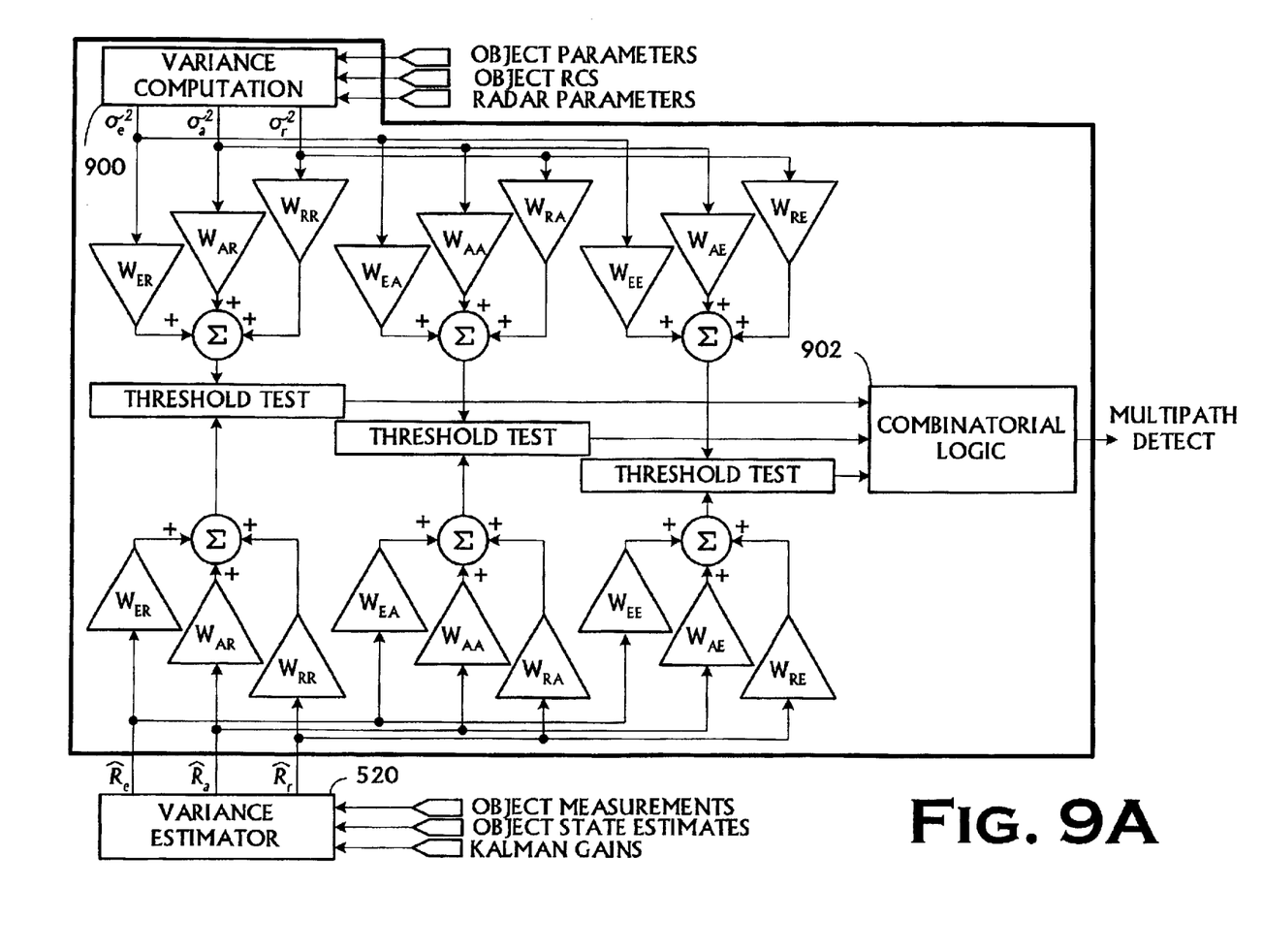
FIG. 9A illustrates one particular embodiment of the multipath detector of the filter in FIG. 2A or FIG. 2B and FIG. 9B and FIG. 9C illustrate alternative implementations of the embodiment in FIG. 9A.

Returning again to FIG. 2A, the multipath detector 220, as mentioned above, detects multipath conditions by comparing the elevation and/or azimuth measurement noise estimates against dynamic thresholds, but also admits some variation in implementation. FIG. 9A illustrates a general, linear 3-channel implementation of the multipath detector 220 in FIG. 2A that tests weighted linear combinations and combines the results. This particular implementation is a radar implementation. The OBJECT POSITION, OBJECT RCS ("Radar Cross-Section"), and RADAR PARAMETERS input to the variance computation 900, are inputs over and above the OBJECT MEASURMENTS (i.e., z[n]), OBJECT STATE ESTIMATE (i.e., x̂[n]), and KALMAN GAINS (i.e., K[n]) input to the variance estimator 520. The weights for a simple elevation channel test would be all zero except for $W_{EE}=1$. Azimuth information can be utilized by setting $W_{EA}=1$ or $W_{AA}=1$, in addition to $W_{EE}=1$. More channels can be added. The combination logic 902 is a digital gate circuit or an equivalent software implementation.

Figure 9B:
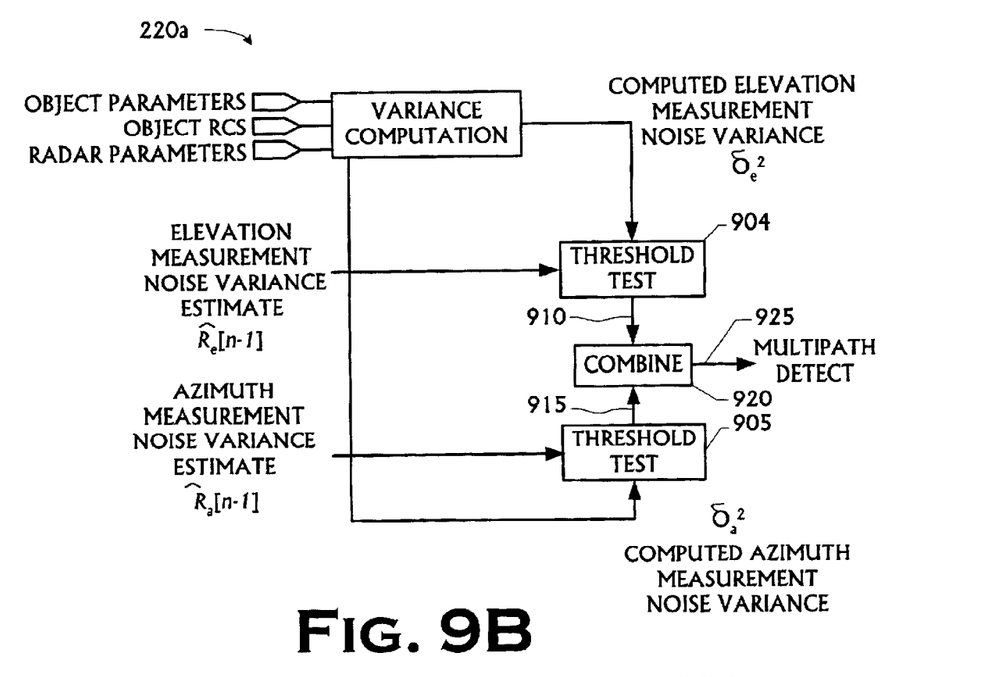

FIG. 9B illustrates a first variation on the implementation of FIG. 9A. In the detector 220a, the elevation variance estimate and the azimuth variance estimate are submitted to respective threshold tests 904, 905. Threshold tests and their use are well known in the art, and, in the illustrated embodiment, are simple comparison tests. The result of the threshold test is therefore a "yes" or "no," which is a "1" or "0" in digital terms. The results 910, 915 of the threshold tests can are then input to a combiner 920, which combines them in a Boolean fashion to generate a "1" or "0" (i.e., "yes" or "no") output 925 indicating whether a multipath condition has been detected. The combiner 920 may be implemented using a logic AND gate or logic OR gate. This particular variation can be realized by setting the weights $W_{EE}$ and $W_{AA}$ in FIG. 9A to 1 and setting all other weights in FIG. 9A to 0.

Figure 9C:
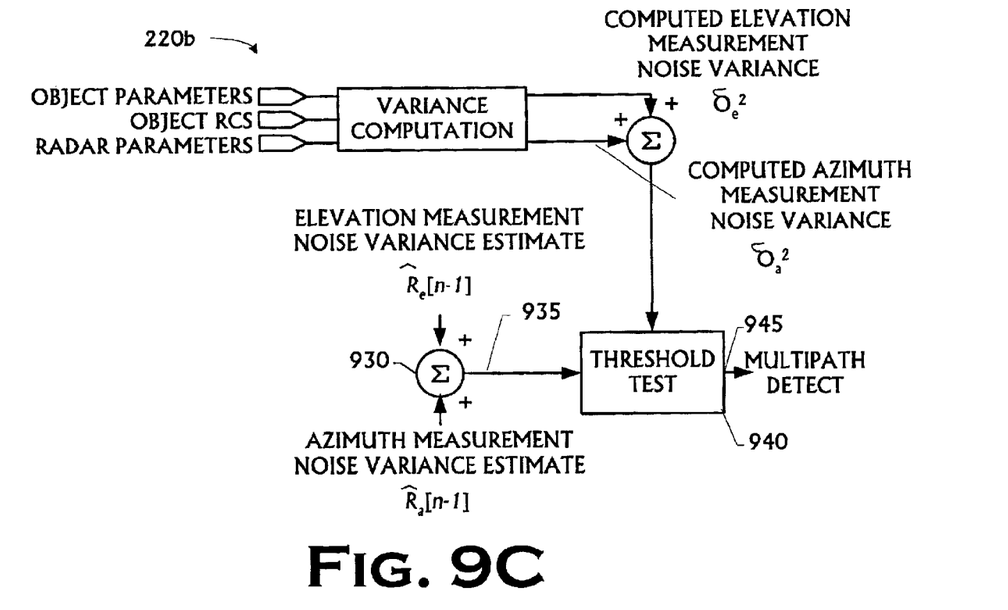

FIG. 9C illustrates a second variation. In the implementation 220b, the elevation variance estimate and the azimuth variance estimate are input to a summer 930, and the sum 935 of the two estimates is submitted to a threshold test 940. The threshold test 940 then generate a "1" or "0" (i.e., "yes" or "no") output 945 indicating whether a multipath condition has been detected. This particular variation can be realized by setting the weights $W_{ER}$ and $W_{AR}$ in FIG. 9A to 1 and setting all other weights in FIG. 9A to 0.

Returning to FIG. 2A, under the conditions that (a) multipath has been detected, and (b) the object is at low altitude, it is also possible to estimate the elevation bias error with the elevation measurement's noise variance estimate. Notice in FIG. 7 how the filtered elevation measurement's bias during multipath is proportional to the measurement noise envelope. The measurement noise envelope is the square root of the noise variance, and, thus, the square root of the measurement noise variance estimate can be the basis for an elevation bias estimate.

At least two schemes are possible for using the measurement noise variance estimate to compensate for multipath induced elevation bias error. The invention may be implemented using either feedback or feedforward modes. FIG. 10A depicts a feedback mode 1000. FIG. 10B depicts a feedforward mode 1050. Note that, in the feedback mode 1000, the bias estimate from the multipath bias estimator 1030 is applied to correct the sensor measurement z[n] before it is filtered by the filtering mechanism 1010 to yield the estimate of the true state A[n]. In the feedforward mode 1050, the bias estimate from the multipath bias estimator 1030 is applied to correct the estimate $\hat{x}[n]$ of the true state yielded by the filtering mechanism 1010 rather than the sensor measurement z[n]. In both modes, the correction is applied only if a multipath condition is detected by the multipath detectors 1020.

First, in the feedback mode of FIG. 10A, the bias estimate is applied to the sensor measurement before input to the Kalman filter. This scheme is that illustrated in FIG. 2A. The Kalman filter update equation becomes $$\hat{x}[n] = \hat{x}[n|n-1] + K[n](z[n] - S[n]\sqrt{R[n-1]} - H[n]\hat{x}[n|n-1]) \quad (29)$$

The scale factor S[n] is the ratio of the bias to the measurements' standard deviation. Under an absolute value of Gaussian assumption for the measurement's noise, this is the ratio of the mean to the standard deviation:

$$\frac{E\{|x|\}}{\sqrt{E\{|x|^2\} - E\{|x|\}^2}} = \frac{\frac{1}{\sqrt{2\pi\sigma^2}}\int_{-\infty}^{\infty}|x|\exp\left(-\frac{x^2}{\sigma^2}\right)dx}{\sqrt{\frac{1}{\sqrt{2\pi\sigma^2}}\int_{-\infty}^{\infty}x^2\exp\left(-\frac{x^2}{\sigma^2}\right)dx - \left[\frac{1}{\sqrt{2\pi\sigma^2}}\int_{-\infty}^{\infty}|x|\exp\left(-\frac{x^2}{\sigma^2}\right)dx\right]^2}} \quad (30)$$

$$= \frac{\frac{2\sigma}{\sqrt{2\pi}}}{\sqrt{\left(1-\frac{2}{\pi}\right)\sigma^2}}$$

$$\approx \frac{4}{3}$$

which is independent of the noise standard deviation. A bias estimate equal to four-thirds the standard deviation estimate is thus indicated, i.e., S[n]=4/3.

Second, in the feedforward mode of FIG. 10B, the bias estimate can be applied to the Kalman filter state estimate outputted by the filter, e.g., $\hat{x}_b[n] = \hat{x}[n] - S[n]\sqrt{\hat{R}[n]}$. In this case, the filter's internal state estimate is not perturbed. A value of S[n]=4/3 is also appropriate for similar reasons to the aforementioned embodiment.

Still other options may become apparent to those skilled in the art having the benefit of this disclosure. As between the two embodiments presented, the first embodiment helps prevent velocity estimation errors in the Kalman filter, which is not true of the second option. In both cases, experimentation has shown the actual multipath noise is not perfectly Gaussian, nor is the multipath elevation bias entirely proportional to the noise variance. That is, some tuning of the bias-to-δ ratio S[n] is beneficial.

Figure 11:
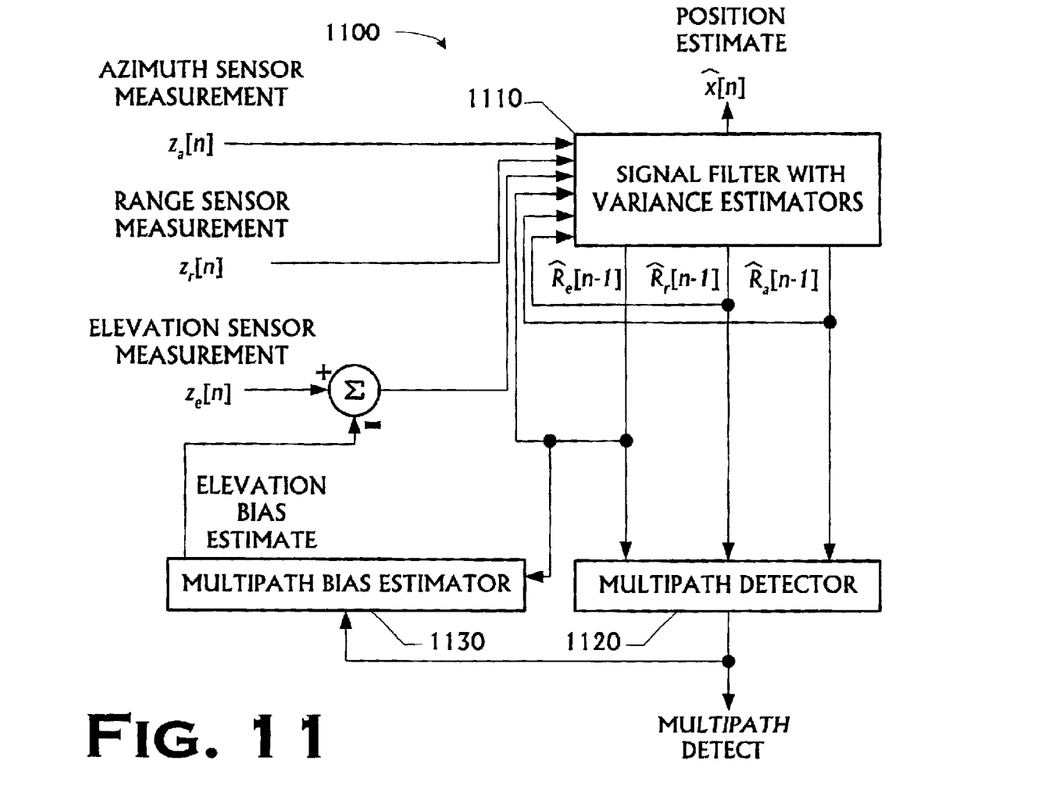
FIG. 11 illustrates in greater detail the processing channels of the embodiment in FIG. 2A.

The invention also permits some variation in the number of channels employed. FIG. 11 illustrates one particular implementation 1100 in which the azimuth and elevation, and range data travel in essentially separate channels, but are filtered by the same filtering mechanism 1110. The filtering mechanism 1110 produces variance estimates $\hat{R}_e[n-1]$, $\hat{R}_a[n-1]$, and $\hat{R}_r[n-1]$ for the elevation, azimuth, and range components $z_e[n]$, $z_a[n]$, and $z_r[n]$ of the sensor measurement z[n]. The noise variances $\hat{R}_e[n-1]$, $\hat{R}_a[n-1]$, and $\hat{R}_r[n-1]$ are employed by the multipath detector 1120 to determine whether multipath conditions exist. If so, the multipath bias estimator then determines an elevation bias estimate that is then used to correct the elevation component $z_e[n]$ of the measured input z[n]. Note that still other variations on this theme are possible.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A position estimator, comprising:
   a signal filter capable of receiving a sensor measurement and generating a measurement noise variance estimate and a position estimate therefrom;
   a multipath detector capable of applying a dynamic threshold against the measurement noise variance estimate to determine whether a multipath condition exists; and
   a multipath bias estimator capable of generating a correction for multipath induced measurement bias error from a measurement noise variance estimate for application upon determining that a multipath condition exists.

2. The position estimator of claim 1, wherein the signal filter includes a Kalman filter.

3. The position estimator of claim 1, wherein the sensor measurement is in a spherical coordinate system including an azimuth angle measurement, an elevation angle measurement, and a range measurement.

4. The position estimator of claim 1, wherein the correction is applied to the sensor measurement.

5. The position estimator of claim 1, wherein the correction is applied to the position estimate.

6. The position estimator of claim 1, wherein the multipath detector includes:
   a first threshold test capable of receiving an elevation measurement noise variance estimate and generating a first result;
   a second threshold test capable of receiving an azimuth measurement noise variance estimate and generating a second result; and
   a combiner capable of combining the first and second results and outputting an indication of whether a multipath condition exists.

7. The position indicator of claim 1, wherein the multipath detector includes:
   a summer summing an elevation measurement noise variance estimate and an azimuth measurement noise variance estimate; and
   a threshold test capable of being applied to the summed measurement noise variance estimates and outputting an indication of whether a multipath condition exists.

8. A method of estimating the position of an object from a sensor measurement, the method comprising:
   filtering the sensor measurement with a signal filter including a measurement noise variance estimator to yield a measurement noise variance estimate and a position estimate;
   comparing the measurement noise variance estimate against a dynamic threshold to detect whether a multipath condition exists;
   determining a correction for a multipath induced measurement bias error from the measurement noise variance estimate if the multipath condition is detected; and
   applying the correction to the estimation of the object's position.

9. The method of claim 8, wherein applying the signal filter with the measurement noise variance estimator includes applying a Kalman filter and the measurement noise variance estimator.

10. The method of claim 8, wherein the sensor measurement is measured in a spherical coordinate system including azimuth angle, elevation angle, and range.

11. The method of claim 8, wherein applying the correction includes applying the correction to the sensor measurement.

12. The method of claim 8, wherein applying the correction includes applying the error to the position estimate.

13. The method of claim 8, wherein comparing the measurement noise variance estimate includes:
   performing a first threshold test on an elevation measurement noise variance estimate and generating a first result;
   performing a second threshold test on an azimuth measurement noise variance estimate and generating a second result; and
   combining the first and second results and outputting an indication of whether a multipath condition exists.

14. The method of claim 8, wherein comparing the elevation variance estimate includes:
   summing an elevation measurement noise variance estimate and an azimuth variance estimate; and
   applying a threshold test to the summed variance estimates and outputting an indication of whether a multipath condition exists.

15. A method for estimating the position of an abject from a sensor measurement, the method comprising:
   filtering the sensor measurement;
   estimating a measurement noise variance of the sensor measurement;
   comparing the measurement noise variance estimate against a dynamic threshold;
   determining from the comparison whether a multipath condition exists; and
   applying a correction for multipath induced measurement bias error generated from the measurement noise variance estimate upon determining that a multipath condition exists.

16. The method of claim 15, wherein filtering the sensor measurement includes filtering the sensor measurement using a Kalman filter.

17. The method of claim 15, wherein the sensor measurement is measured in a spherical coordinate system including an azimuth angle measurement, an elevation angle measurement, and a range measurement.

18. The method of claim 15, wherein comparing the measurement noise variance estimate against the dynamic threshold includes:
   applying a first threshold to a measurement noise variance estimate in elevation;
   applying a second threshold to a measurement noise variance estimate in azimuth; and
   combining the results of comparing elevation and azimuth variance estimates with the first and second thresholds, respectively.

19. The method of claim 15, wherein comparing the measurement noise variance estimate against the dynamic threshold includes:
   summing a measurement noise variance estimate in elevation with a measurement noise variance estimate in azimuth; and
   applying a threshold to the summed measurement noise variance estimates.

20. A position estimator, comprising:
   means for receiving a sensor measurement and generating a measurement noise variance estimate and a position estimate therefrom;
   means for applying a dynamic threshold against the measurement noise variance estimate to determine whether a multipath condition exists; and
   a multipath bias estimator capable of generating a correction for multipath induced measurement bias error from a measurement noise variance estimate for application upon determining that a multipath condition exist.

21. The position estimator of claim 20, wherein the means for receiving the sensor measurement and generating the measurement noise variance estimate and the position estimate therefrom includes a Kalman filter.

22. The position estimator of claim 20, wherein the sensor measurement is in a spherical coordinate system including an azimuth angle measurement, an elevation angle measurement, and a range measurement.

23. The position estimator of claim 20, wherein the correction is applied to the sensor measurement.

24. The position estimator of claim 20, wherein the correction is applied to the position estimate.

25. The position estimator of claim 20, wherein the means for applying the dynamic threshold against the measurement noise variance estimate to determine whether the multipath condition exists includes:
   a first threshold test capable of receiving an elevation measurement noise variance estimate and generating a first result;
   a second threshold test capable of receiving an azimuth measurement noise variance estimate and generating a second result; and
   a combiner capable of combining the first and second results and outputting an indication of whether a multipath condition exists.

26. The position indicator of claim 20, wherein the means for applying the dynamic threshold against the measurement noise variance estimate to determine whether the multipath condition exists includes:

a summer summing an elevation measurement noise variance estimate and an azimuth measurement noise variance estimate; and a threshold test capable of being applied to the summed measurement noise variance estimates and outputting an indication of whether a multipath condition exists.

27. A position estimator, comprising:

means for filtering the sensor measurement with a signal filter including a measurement noise variance estimator to yield a measurement noise variance estimate and a position estimate;

means for comparing the measurement noise variance estimate against a dynamic threshold to detect whether a multipath condition exists;

a means for determining a correction for a multipath induced measurement bias error from the measurement noise variance estimate if the multipath condition is detected; and means for applying the correction to the estimation of the object's position.

28. The position estimator of claim 27, wherein the means for applying the signal filter with the measurement noise variance estimator includes means for applying a Kalman filter and the measurement noise variance estimator.

29. The position estimator of claim 27, wherein the means for applying the correction includes means for applying the correction to the sensor measurement.

30. The position estimator of claim 27, wherein the means forapplying the correction includes means for applying the error to the position estimate.

31. A program storage medium encoded with instructions that, when executed by a computer, perform a method of estimating the position of an object from a sensor measurement, the method comprising:

filtering the sensor measurement with a signal filter including a measurement noise variance estimator to yield a measurement noise variance estimate and a position estimate;

comparing the measurement noise variance estimate against a dynamic threshold to detect whether a multipath condition exists;

determining a correction for a multipath induced measurement bias error from the measurement noise variance estimate if the multipath condition is detected; and applying the correction to the estimation of the object's position.

32. The program storage medium of claim 31, wherein applying the signal filter with the measurement noise variance estimator in the encoded method includes applying a Kalman filter and the measurement noise variance estimator.

33. The program storage medium of claim 31, wherein applying the correction in the encoded method includes applying the correction to the sensor measurement.

34. The program storage medium of claim 31, wherein applying the correction in the encoded method includes applying the error to the position estimate.

35. A computing apparatus programmed to perform a method of estimating the position of an object from a sensor measurement, the method comprising:

filtering the sensor measurement with a signal filter including a measurement noise variance estimator to yield a measurement noise variance estimate and a position estimate;

comparing the measurement noise variance estimate against a dynamic threshold to detect whether a multipath condition exists;

determining a correction for a multipath induced measurement bias error from the measurement noise variance estimate if the multipath condition is detected; and applying the correction to the estimation of the object's position.

36. The computing apparatus of claim 35, wherein applying the signal filter with the measurement noise variance estimator in the programmed method includes applying a Kalman filter and the measurement noise variance estimator.

37. The computing apparatus of claim 35, wherein applying the correction in the programmed method includes applying the correction to the sensor measurement.

38. The computing apparatus of claim 35, wherein applying the correction in the programmed method includes applying the error to the position estimate.

* * * * *